(12) United States Patent
Tanaka et al.

(10) Patent No.: US 8,138,684 B2
(45) Date of Patent: Mar. 20, 2012

(54) DISCHARGE LAMP LIGHTING DEVICE, CONTROL METHOD THEREOF, AND PROJECTOR

(75) Inventors: Kazuhiro Tanaka, Azumino (JP);
Kentaro Yamauchi, Ashiya (JP); Tetsuo Terashima, Chino (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 438 days.

(21) Appl. No.: 12/401,926

(22) Filed: Mar. 11, 2009

(65) Prior Publication Data
US 2009/0231553 A1    Sep. 17, 2009

(30) Foreign Application Priority Data

Mar. 14, 2008  (JP) .................................. 2008-066098

(51) Int. Cl.
*H05B 41/36*   (2006.01)
(52) U.S. Cl. .......................... 315/291; 315/300; 315/302
(58) Field of Classification Search .................. 315/194, 315/195, 209 R, 224, 291, 287, 294, 297, 315/299, 300, 301, 302, 307, 308, 326
See application file for complete search history.

(56) References Cited

U.S. PATENT DOCUMENTS
5,608,294 A    3/1997    Derra et al.

FOREIGN PATENT DOCUMENTS
JP    10-501919 T    2/1998
WO    WO-95-35645 A    12/1995

*Primary Examiner* — Douglas W Owens
*Assistant Examiner* — Jianzi Chen
(74) *Attorney, Agent, or Firm* — AdvantEdge Law Group, LLC (57) ABSTRACT

A discharge lamp lighting device includes: a power control circuit outputting DC current; an AC conversion circuit being supplied with the DC current and generating and outputting discharge-lamp driving AC current by inverting the polarity of the DC current at a predetermined time; and a control unit performing a duty ratio control process of controlling a duty ratio on the basis of a polarity inversion time of the discharge-lamp driving AC current on the AC conversion circuit and performing an interval current control process of controlling a current value of the DC current every polarity inversion time interval on the power control circuit. Here, the control unit performs the interval current control process so as to control a difference between an average value and a maximum value of the DC current of each polarity inversion time interval on the basis of a difference between the duty ratio and a predetermined reference duty ratio.

17 Claims, 9 Drawing Sheets

DISCHARGE LAMP LIGHTING DEVICE, CONTROL METHOD THEREOF, AND PROJECTOR

BACKGROUND

1. Technical Field

The present invention relates to a discharge lamp lighting device, a control method thereof, and a projector.

2. Related Art

Electric-discharge lamps (hereinafter, referred to as discharge lamp) such as high-pressure mercury lamps or metal halide lamps are used as a light source of projectors. In the discharge lamps, a shape of an electrode is changed by dissipation of the electrode due to the electric discharge and thus flickers in which a discharge start position is suddenly changed may occur. When the flickers occur, the brightness of the discharge lamps is suddenly changed greatly, which is not desirable.

To solve this problem, a discharge lamp driving method is known in which the flickers are suppressed by raising a current value of the AC driving current in a second half of a half cycle of discharge-lamp driving AC current (see JP-T-10-501919).

However, in the driving method disclosed in JP-T-10-501919, the current value is periodically changed. Accordingly, the brightness of the discharge lamp is periodically changed, though the change is smaller than the flickers. For example, when the discharge-lamp driving AC current has 78 Hz, the brightness of the discharge lamp is periodically changed at a frequency of 156 Hz which is double the AC frequency and at a frequency of the integral multiple of the AC frequency.

On the other hand, in a projector employing a liquid crystal panel, since display data is rewritten periodically, the brightness is also periodically changed. For example, when the rewriting frequency is 50 Hz, the brightness is periodically changed at frequencies of 50 Hz and the integral multiple of the rewriting frequency.

When the discharge lamp and the liquid crystal panel are combined, the periodical changes in brightness interfere with each other, thereby causing a scroll noise. For example, in the above-mentioned example, the change in brightness of the discharge lamp of 156 Hz and the change in brightness of the liquid crystal panel of 150 Hz interfere with each other, thereby causing a scroll noise of 6 Hz.

Accordingly, in the past, it was necessary to select the frequency of the discharge-lamp driving AC current so as to be a frequency at which the scroll noise cannot be made to be visible (for example, frequency of the scroll noise is not less than 20 Hz) by the combination with the liquid crystal panel.

SUMMARY

An advantage of some aspects of the invention is that it provides a discharge lamp lighting device that can freely select a frequency of discharge-lamp driving AC current, a control method thereof, and a projector.

According to an aspect of the invention, there is provided a discharge lamp lighting device including: a power control circuit outputting DC current; an AC conversion circuit being supplied with the DC current and generating and outputting discharge-lamp driving AC current by inverting the polarity of the DC current at a predetermined time; and a control unit performing a duty ratio control process of controlling a duty ratio on the basis of a polarity inversion time of the discharge-lamp driving AC current on the AC conversion circuit and performing an interval current control process of controlling a current value of the DC current every polarity inversion time interval on the power control circuit. Here, the control unit performs the interval current control process so as to control a difference between an average value and a maximum value of the DC current of each polarity inversion time interval on the basis of a difference between the duty ratio and a predetermined reference duty ratio.

According to this configuration, it is possible to embody a discharge lamp lighting device that can suppress a scroll noise so as not to be visible and freely select the frequency of the discharge-lamp driving AC current.

The duty ratio represents a ratio of a time of a first polarity to one cycle of the discharge-lamp driving AC current in which the first polarity and a second polarity are inverted.

The reference duty ratio may be 50%.

In the discharge lamp lighting device, the control unit may perform the interval current control process so as to increase the difference between the average value and the maximum value of the DC current of each polarity inversion time interval as the difference between the duty ratio and the reference duty ratio increases.

In the discharge lamp lighting device, the control unit may perform the interval current control process so as to set to the maximum the current value of the DC current in each polarity inversion time interval in the second half of the polarity inversion time interval.

In the discharge lamp lighting device, the control unit may perform the interval current control process so as to monotonously increase the current value of the DC current in the polarity inversion time interval.

In the discharge lamp lighting device, the control unit may perform the interval current control process so as to set to 0 the difference between the average value and the maximum value of the DC current every polarity inversion time interval when the duty ratio is equal to the reference duty ratio.

In the discharge lamp lighting device, the control unit may perform the interval current control process so as to set the average values of the DC current of the respective polarity inversion time intervals to be equal to each other.

In the discharge lamp lighting device, the control unit may perform the duty ratio control process so as to change the duty ratio in a periodic pattern.

In the discharge lamp lighting device, the control unit may perform the duty ratio control process so as to change the duty ratio in the periodic pattern which includes a plurality of segmented periods where the duty ratio is kept at a constant value and in which the duty ratios of at least two segmented periods of the plurality of segmented periods are different from each other.

According to another aspect of the invention, there is provided a control method of a discharge lamp lighting device having a power control circuit outputting DC current and an AC conversion circuit being supplied with the DC current and generating and outputting discharge-lamp driving AC current by inverting the polarity of the DC current at a predetermined time, the control method including: a procedure of performing a duty ratio control process of controlling a duty ratio on the basis of a polarity inversion time of the discharge-lamp driving AC current on the AC conversion circuit; and a procedure of performing an interval current control process of controlling a current value of the DC current every polarity inversion time interval on the power control circuit. Here, the interval current control process is performed so as to control a difference between an average value and a maximum value of the DC current of each polarity inversion time interval on the basis of a difference between the duty ratio and a predetermined reference duty ratio.

According to this configuration, it is possible to embody a control method of a discharge lamp lighting device that can suppress a scroll noise so as not to be visible and freely select the frequency of the discharge-lamp driving AC current.

According to another aspect of the invention, there is provided a projector comprising the above-mentioned discharge lamp lighting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail with reference to the accompanying drawings. The embodiments to be described below are not intended to improperly define the details of the invention described in the appended claims. It cannot be said that constituent elements to be described below are necessary constituent elements of the invention.

1. Optical System of Projector

Figure 1:
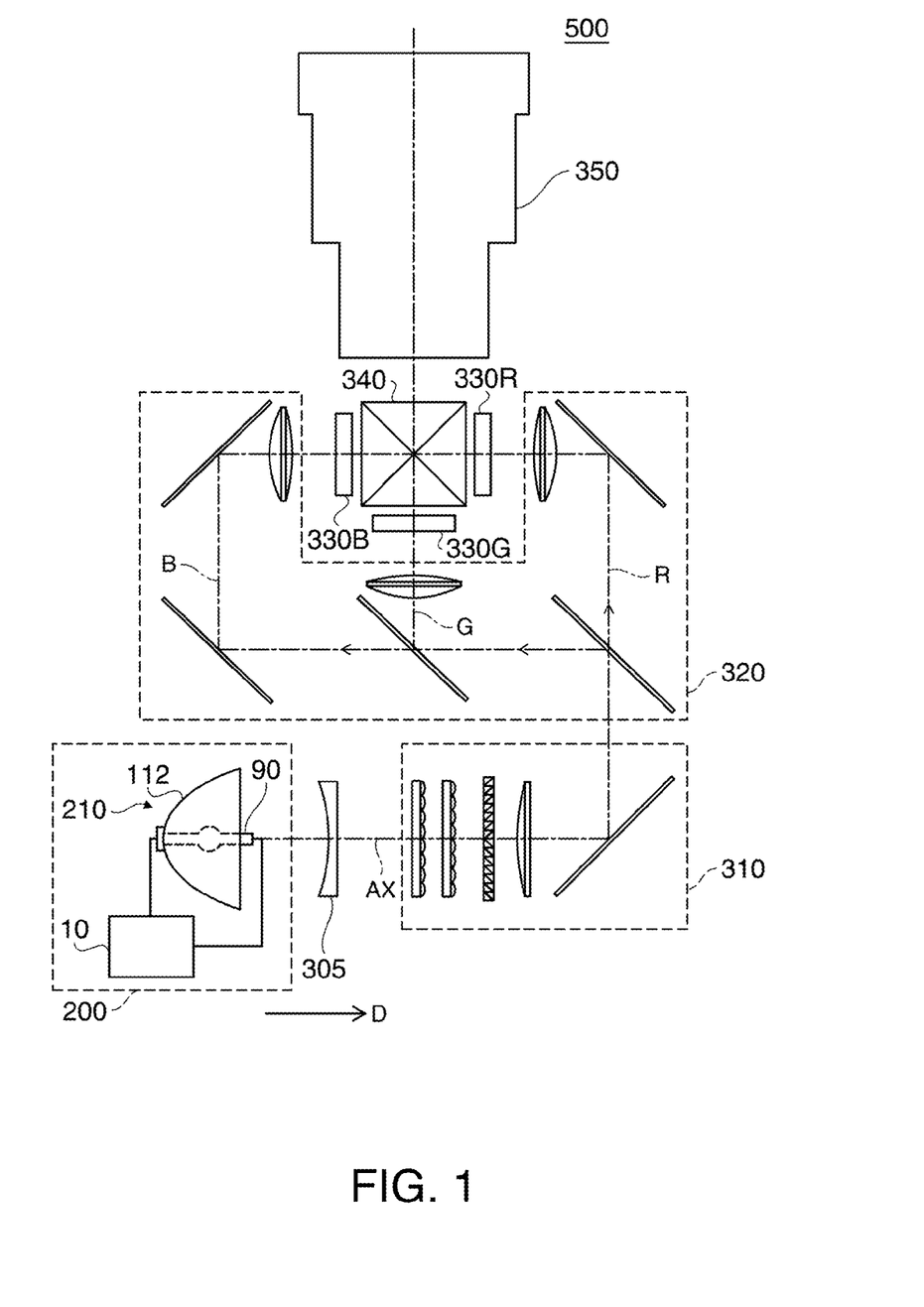
FIG. 1 is a diagram illustrating an optical system of a projector according to an embodiment of the invention.

FIG. 1 is a diagram illustrating a projector 500 according to an embodiment of the invention. The projector 500 includes a light source device 200, a collimating lens 305, an illumination optical system 310, a color-separating optical system 320, three liquid crystal light valves 330R, 330G, and 330B, a cross dichroic prism 340, and a projection optical system 350.

The light source device 200 includes a light source unit 210 and a discharge lamp lighting device 10. The light source unit 210 includes a primary reflecting mirror 112, a secondary reflecting mirror 50, and a discharge lamp 90. The discharge lamp lighting device 10 supplies power to the discharge lamp 90 to light the discharge lamp 90. The primary reflecting mirror 112 reflects light emitted from the discharge lamp 90 in a radiation direction D. The radiation direction D is parallel to an optical axis AX. The light from the light source unit 210 is incident on the illumination optical system 310 through the collimating lens 305. The collimating lens 305 collimates the light from the light source unit 210.

The illumination optical system 310 uniformizes the illuminance of the light from the light source device 200 in the liquid crystal light valves 330R, 330G, and 330B. The illumination optical system 310 concentrates the polarization directions of the light from the light source device 200 on one direction. This is for effectively utilizing the light from the light source device 200 in the liquid crystal light valves 330R, 330G, and 330B. The light of which the illuminance distribution and the polarization direction are adjusted is incident on the color-separating optical system 320. The color-separating optical system 320 separates the incident light into three color components of red (R), green (G), and blue (B). The three color components are modulated by the liquid crystal light valves 330R, 330G, and 330B corresponding to the colors, respectively. The liquid crystal light valves 330R, 330G, and 330B include liquid crystal panels 560R, 560G, and 560B and polarizing plates disposed on a light input side and a light output side of the respective liquid crystal panels 560R, 560G, and 560B. The modulated three color components are synthesized by the cross dichroic prism 340. The synthesized light is incident on the projection optical system 350. The projection optical system 350 projects the incident light onto a screen not shown. As a result, an image is displayed on the screen.

Various known configurations can be employed as the configurations of the collimating lens 305, the illumination optical system 310, the color-separating optical system 320, the cross dichroic prism 340, and the projection optical system 350.

Figure 2:
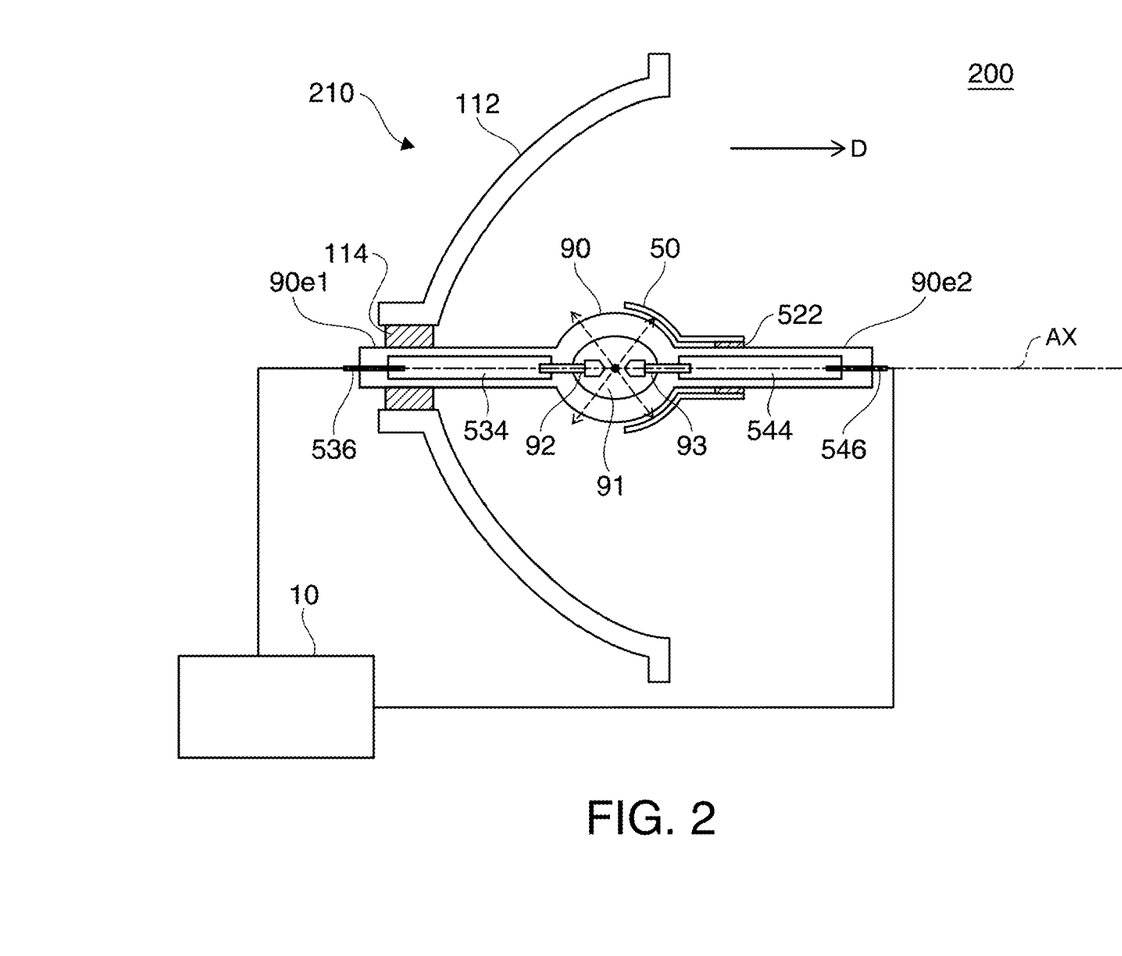
FIG. 2 is a diagram illustrating the optical system according to the projector according to the embodiment of the invention.

FIG. 2 is a diagram illustrating a configuration of the light source device 200. The light source device 200 includes a light source unit 210 and a discharge lamp lighting device 10. In the drawing, a sectional view of the light source unit 210 is shown. The light source unit 210 includes a primary reflecting mirror 112, a discharge lamp 90, and a secondary reflecting mirror 50.

The discharge lamp 90 has a rod shape extending in the radiation direction D from a first end portion 90e1 to a second end portion 90e2. The discharge lamp 90 is made of a light transmitting material such as quartz glass. The center of the discharge lamp 90 swells in a spherical shape and a discharge space 91 is formed therein. The discharge space 91 is filled with gas as a discharge medium including rare gas and metal halogen compound.

In the discharge space 91, two electrodes 92 and 93 protrude from the discharge lamp 90. The first electrode 92 is disposed close to the first end portion 90e1 in the discharge space 91 and the second electrode 93 is disposed close to the second end portion 90e2 in the discharge space 91. The electrodes 92 and 93 have a rod shape extending along the optical axis AX. In the discharge space 91, electrode ends (also referred to as "discharge end") of the electrodes 92 and 93 are opposed to each other with a predetermined distance therebetween. The electrodes 92 and 93 are formed of metal such as tungsten.

A first terminal 536 is disposed in the first end portion 90e1 of the discharge lamp 90. The first terminal 536 and the first electrode 92 are electrically connected to each other through a conductive member 534 passing through the inside of the discharge lamp 90. Similarly, a second terminal 546 is disposed in the second end portion 90e2 of the discharge lamp 90. The second terminal 546 and the second electrode 93 are electrically connected to each other through a conductive member 544 passing through the inside of the discharge lamp 90. The terminals 536 and 546 are made of metal such as tungsten. For example, a molybdenum foil is used as the conductive members 534 and 544.

The terminals 536 and 546 are connected to the discharge lamp lighting device 10. The discharge lamp lighting device 10 supplies AC current to the terminals 536 and 546. As a result, an arc discharge is generated between the two electrodes 92 and 93. The light (discharged light) generated by the arc discharge is radiated in all directions from the discharge position as indicated by broken arrows.

The primary reflecting mirror 112 is fixed to the first end portion 90e1 of the discharge lamp 90 by a fixing member 114. The reflecting surface (the surface facing the discharge lamp 90) of the primary reflecting mirror 112 has a spheroidal shape. The primary reflecting mirror 112 reflects the discharged light in the radiation direction D. The reflecting surface of the primary reflecting mirror 112 is not limited to the spheroidal shape, but may employ various shapes as long as it can reflect the discharged light in the radiation direction D. For example, a rotated parabola shape may be employed. In this case, the primary reflecting mirror 112 can convert the discharged light into light almost parallel to the optical axis AX. Accordingly, the collimating lens 305 can be omitted.

The secondary reflecting mirror 50 is fixed to the second end portion 90e2 of the discharge lamp 90 by a fixing member 522. The reflecting surface (surface facing the discharge lamp 90) of the secondary reflecting mirror 50 has a spherical shape surrounding the second end portion 90e2 in the discharge space 91. The secondary reflecting mirror 50 reflects the discharged light to the primary reflecting mirror 112. Accordingly, it is possible to enhance the utilization efficiency of the light emitted from the discharge space 91.

Any heat-resistance material (such as inorganic adhesive) resistant to the heat emitted from the discharge lamp 90 can be employed as the material of the fixing members 114 and 522. The method of arranging the primary reflecting mirror 112, the secondary reflecting mirror 50, and the discharge lamp 90 is not limited to the method of fixing the primary reflecting mirror 112 and the secondary reflecting mirror 50 to the discharge lamp 90, but may employ any method. For example, the discharge lamp 90 and the primary reflecting mirror 112 may be independently fixed to a chassis (not shown) of a projector. The same is applied to the secondary reflecting mirror 50.

Figure 3:
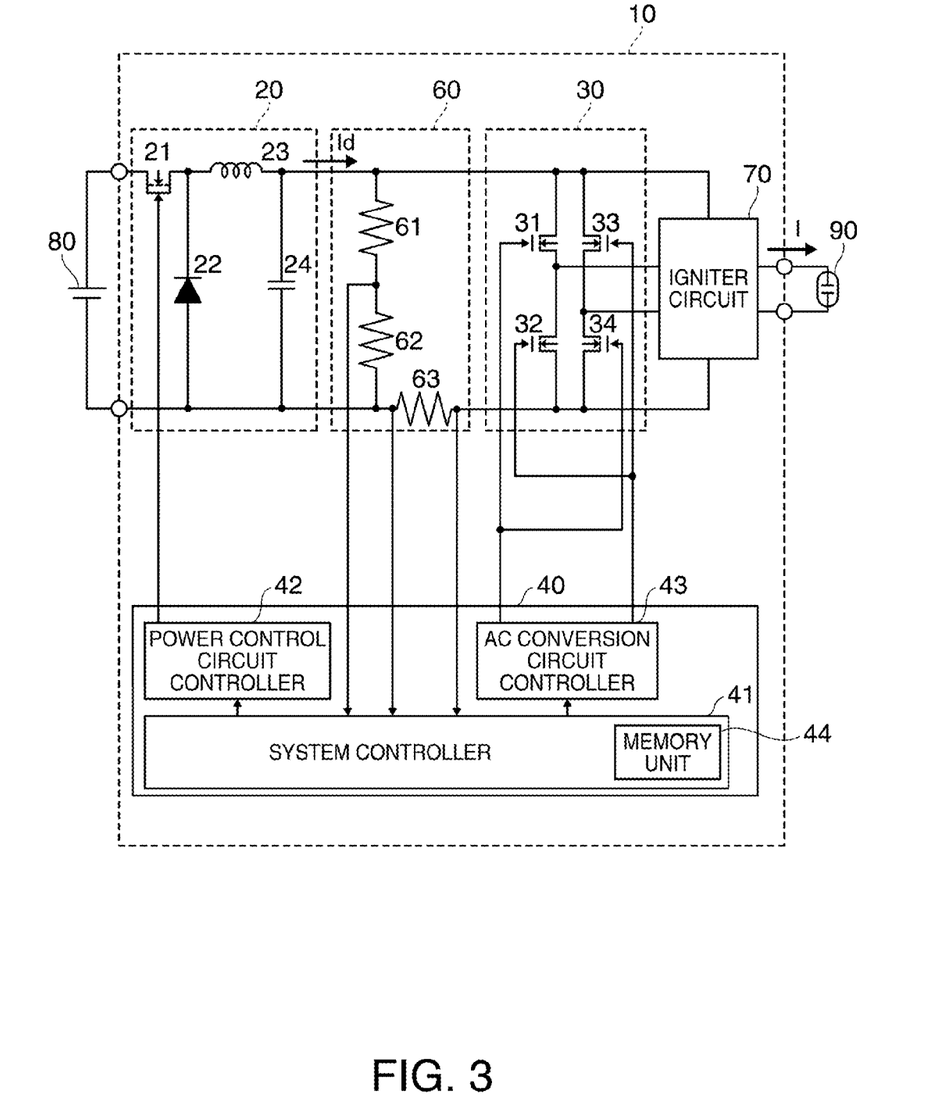
FIG. 3 is a diagram illustrating a configuration of a discharge lamp lighting device according to an embodiment of the invention.

2. Discharge Lamp Lighting Device
(1) Configuration of Discharge Lamp Lighting Device FIG. 3 is a circuit diagram illustrating the discharge lamp lighting device according to this embodiment.

The discharge lamp lighting device 10 includes a power control circuit 20. The power control circuit 20 controls the driving power supplied to the discharge lamp 90. In this embodiment, the power control circuit 20 is formed of a down-chopper circuit receiving a DC source 80 as an input, dropping the input voltage, and outputting DC current Id.

The power control circuit 20 may include a switching element 21, a diode 22, a coil 23, and a capacitor 24. The switching element 21 may be formed of, for example, a transistor. In this embodiment, one end of the switching element 21 is connected to a positive voltage side of the DC source 80 and the other end is connected to the cathode of the diode 22 and one end of the coil 23. One end of the capacitor 24 is connected to the other end of the coil 23 and the other end of the capacitor 24 is connected to the anode of the diode 22 and a negative voltage side of the DC source 80. The control terminal of the switching element 21 is supplied with a current control signal from a control unit 40 to control ON or OFF of the switching element 21. For example, a PWM control signal may be used as the current control signal.

Here, when the switching element 21 is turned on, current flows in the coil 23 and energy is accumulated in the coil 23. Thereafter, when the switching element 21 is turned off, the energy accumulated in the coil 23 is discharged in a path passing through the capacitor 24 and the diode 22. As a result, the DC current Id corresponding to the ratio of the time when the switching element 21 is turned on is generated.

The discharge lamp lighting device 10 includes an AC conversion circuit 30. The AC conversion circuit 30 receives the DC current Id output from the power control circuit 20 as an input and generates and outputs discharge-lamp driving current having a frequency and a duty ratio by inverting the polarity at a predetermined time. The duty ratio is a ratio of a time of a first polarity to one cycle of discharge-lamp driving AC current I which is alternately inverted into the first polarity and a second polarity. In this embodiment, the AC conversion circuit 30 is formed of an inverter bridge circuit (full bridge circuit).

The AC conversion circuit 30 includes first to fourth switching elements 31 to 34 such as transistors, where the first and second switching elements 31 and 32 connected in series and the third and fourth switching elements 33 and 34 connected in series are connected to each other in parallel. The control terminals of the first to fourth switching elements 31 to 34 are supplied with a frequency control signal from the control unit 40 to control ON and OFF of the first to fourth switching elements 31 to 34.

The AC conversion circuit 30 alternately inverts the polarity of the DC current Id output from the power control circuit 20 by alternately turning on and off the first and fourth switching elements 31 and 34 and the second and third switching elements 32 and 33, and generates and outputs the discharge-lamp driving AC current I having controlled frequency and duty ratio from a common node of the first and second switching elements 31 and 32 and a common node of the third and fourth switching elements 33 and 34.

That is, the second and third switching elements 32 and 33 are turned off when the first and fourth switching elements 31 and 34 are turned on. In addition, the second and third switching elements 32 and 33 are turned on when the first and fourth switching elements 31 and 34 are turned off. Accordingly, when the first and fourth switching elements 31 and 34 are turned on, the discharge-lamp driving AC current I sequentially flowing from one end of the capacitor 24 through the first switching element 31, the discharge lamp 90, and the fourth switching element 34 is generated. When the second and third switching elements 32 and 33 are turned on, the discharge-lamp driving AC current I sequentially flowing from one end of the capacitor 24 through the third switching element 33, the discharge lamp 90, and the second switching element 32 is generated.

The discharge lamp lighting device 10 includes a control unit 40. The control unit 40 controls the current value, the frequency, the duty ratio, and the waveform of the discharge-lamp driving AC current I by controlling the power control circuit 20 and the AC conversion circuit 30. The control unit 40 performs a duty ratio control process of controlling the duty ratio using the polarity conversion time of the discharge-lamp driving AC current I on the AC conversion circuit 30 and performs an interval current control process of controlling the current value of the output DC current Id every polarity conversion time interval on the power control circuit 20. Here, the polarity conversion time interval means a time between the polarity conversion times temporally adjacent to each other. That is, one period of the discharge-lamp driving AC current I includes two polarity conversion time intervals.

The configuration of the control unit 40 is not particularly limited, but in this embodiment, the control unit 40 includes a system controller 41, a power control circuit controller 42, and an AC conversion circuit controller 43. A part or all of the control unit 40 may be formed of a semiconductor integrated circuit.

The system controller 41 controls the power control circuit 20 and the AC conversion circuit 30 by controlling the power control circuit controller 42 and the AC conversion circuit controller 43. The system controller 41 may control the power control circuit controller 42 and the AC conversion circuit controller 43 on the basis of the discharge-lamp driving voltage and the discharge-lamp driving AC current I detected by an operation detector 60 disposed in the discharge lamp lighting device 10, which will be described later.

In this embodiment, the system controller 41 includes a memory unit 44. The memory unit 44 may be disposed independent of the system controller 41.

The system controller 41 may control the power control circuit 20 and the AC conversion circuit 30 on the basis of information stored in the memory unit 44. The memory unit 44 may store information on the current value, the frequency, the duty ratio, and the waveform of the discharge-lamp driving AC current I.

The power control circuit controller 42 controls the power control circuit 20 by outputting a current control signal to the power control circuit 20 on the basis of a control signal from the system controller 41.

The AC conversion circuit controller 43 controls the AC conversion circuit 30 by outputting an inversion control signal to the AC conversion circuit 30 on the basis of a control signal from the system controller 41.

The discharge lamp lighting device 10 may include an operation detector 60. The operation detector 60 may detect the operation of the discharge lamp 90 such as the discharge-lamp driving voltage or the discharge-lamp driving AC current I and output driving voltage information or driving current information. In this embodiment, the operation detector 60 includes first to third resistors 61 to 63.

The operation detector 60 is disposed in parallel to the discharge lamp 90, detects the discharge-lamp driving voltage by the use of the voltages divided by the first and second resistors 61 and 62 connected in series to each other, and detects the discharge-lamp driving AC current I using the voltage generated in the third resistor 63 connected in series to the discharge lamp 90.

The discharge lamp lighting device 10 may include an igniter circuit 70. The igniter circuit 70 operates only at the time of starting lighting the discharge lamp 90 and supplies the electrodes of the discharge lamp 90 with a high voltage (voltage higher than that of a normal control operation) necessary for breaking down the electrical insulation of the electrodes of the discharge lamp 90 to form a discharge path at the time of starting lighting the discharge lamp 90. In this embodiment, the igniter circuit 70 is connected in parallel to the discharge lamp 90.

Figure 4A:
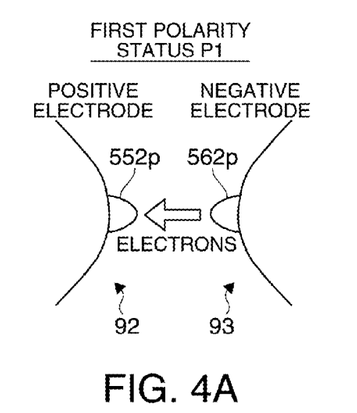
FIGS. 4A, 4B, 4C, and 4D are diagrams illustrating the configuration of the discharge lamp lighting device according to the embodiment of the invention.
Figure 4B:
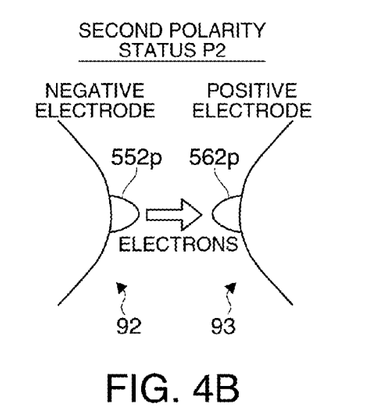

FIGS. 4A to 4D are diagrams illustrating a relation between the polarity of the driving power supplied to the discharge lamp 90 and the temperature of the electrodes. FIGS. 4A and 4B show operations states of two electrodes 92 and 93. In the drawings, the ends of the two electrodes 92 and 93 are shown. Protrusions 552$p$ and 562$p$ are disposed in the ends of the electrodes 92 and 93, respectively. The discharge is generated between the protrusions 552$p$ and 562$p$. In this embodiment, it is possible to suppress the movement in discharge position (arc position) in the electrodes 92 and 93, compared with a case where the protrusions are not provided. However, the protrusions may be omitted.

FIG. 4A shows a first polarity status P1 where the first electrode 92 serves as a positive electrode and the second electrode 93 serves as a negative electrode. In the first polarity status P1, electrons move from the second electrode 93 (negative electrode) to the first electrode 92 (positive electrode) due to the discharge. Electrons are emitted from the negative electrode (second electrode 93). The electrons emitted from the negative electrode (second electrode 93) collide with the end of the positive electrode (first electrode 92). Heat is generated from the collision and thus the temperature of the end (protrusion 552$p$) of the positive electrode (first electrode 92) rises.

FIG. 4B shows a second polarity status P2 where the first electrode 92 serves as a negative electrode and the second electrode 93 serves as a positive electrode. In the second polarity status P2, oppositely to the first polarity status P1, electrons move from the first electrode 92 to the second electrode 93. As a result, the temperature of the end (protrusion 562$p$) of the second electrode 93 rises.

In this way, the temperature of the positive electrode can more easily rise than that of the negative electrode. Here, when the temperature of one electrode is continuously higher than that of the other electrode, various problems may be caused. For example, when the end of the high-temperature electrode is excessively melted, an unintended great deformation of the electrode may be caused. As a result, the arc length may depart from a proper value. When the melting of the end of the low-temperature electrode is not sufficient, minute unevenness formed at the end may not be melted and remain. As a result, a so-called arc jump may occur (the arc position unstably moves).

Figure 4C:
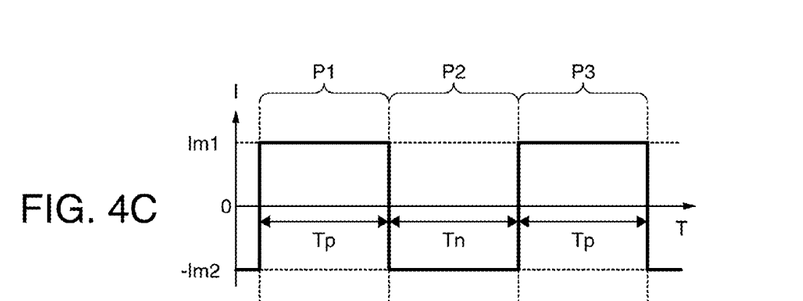

As a technique of suppressing the above-mentioned problem, an AC driving operation of alternating the polarities of the electrodes can be used. FIG. 4C is a timing diagram illustrating AC power (driving signal) supplied to the discharge lamp 90 (FIG. 2). The horizontal axis represents the time T and the vertical axis represents the current value of the AC current I. The AC current I represents the current flowing in the discharge lamp 90. The positive value thereof represents the first polarity status P1 and the negative value thereof represents the second polarity status P2. In the example shown in FIG. 4C, rectangular-waveform AC current is used. The first polarity status P1 and the second polarity status P2 are alternately repeated. Here, a first polarity interval Tp represents a time when the first polarity status P1 is maintained and a second polarity interval Tn represents a time when the second polarity status P2 is maintained. The average current value in the first polarity interval Tp is +A0 and the average current value in the second polarity interval Tn is −A0. The driving frequency can be experimentally determined depending on the characteristic of the discharge lamp 90 (for example, a value in the range of 30 Hz to 1 kHz is employed). The other values of +A0, −A0, Tp, and Tn can be experimentally determined similarly.

Figure 4D:
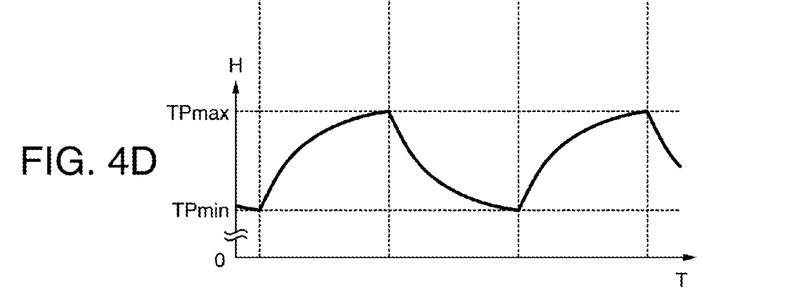

FIG. 4D is a timing diagram illustrating a temperature variation of the first electrode 92. The horizontal axis represents the time T and the vertical axis represents the temperature H. The temperature H of the first electrode 92 rises in the first polarity status P1 and the temperature H of the first electrode 92 falls in the second polarity status P2. Since the first polarity status P1 and the second polarity status P2 are repeated, the temperature H periodically varies between the minimum value Hmin and the maximum value Hmax. Although not shown, the temperature of the second electrode 93 varies in a phase opposite to that of the temperature H of the first electrode 92. That is, the temperature of the second electrode 93 falls in the first polarity status P1 and the temperature of the second electrode 93 rises in the second polarity status P2.

In the first polarity status P1, the end of the first electrode 92 (protrusion 552p) is melted and thus the end of the first electrode 92 (protrusion 552p) is smoothed. Accordingly, it is possible to suppress the movement of discharge position in the first electrode 92. Since the temperature of the end of the second electrode 93 (protrusion 562p) falls, the excessive melting of the second electrode 93 (protrusion 562p) is suppressed. Accordingly, it is possible to prevent the unintended deformation of the electrode. In the second polarity status P2, the first electrode 92 and the second electrode 93 are opposite to each other in operation. Accordingly, by repeating two statuses P1 and P2, the problems of the two electrodes 92 and 93 can be suppressed.

Here, when the waveform of the current I is symmetric, that is, when the waveform of the current I satisfies the conditions of $|+A0|=|-A0|$ and Tp=Tn, the conditions of power to be supplied in the two electrodes 92 and 93 are the same. Accordingly, it is estimated that the difference in temperature between the two electrodes 92 and 93 decreases. When the symmetric current waveform is maintained in driving, the normal convection occurs in the discharge space 91. Thus, the electrode material may be deposited or segregated locally in axial portions of the electrodes to grow in a needle shape and an unintended discharge may be generated toward the wall surface of the light-transmitting material surrounding the discharge space 91. The unintended discharge may serve as a cause to deteriorate the inner wall and to reduce the lifetime of the discharge lamp 90. When the driving is maintained in the symmetric current waveform, the electrodes are kept in a constant temperature distribution for a long time. Accordingly, the asymmetry of the electrodes due to the temporal variation in status is further promoted with the lapse of time.

(2) Example of Interval Current Control Process

A specific example of an interval current control process in the discharge lamp lighting device 10 according to this embodiment will be described now.

In the discharge lamp lighting device 10 according to this embodiment, the control unit 40 performs an interval current control process of controlling a difference between the average value and the maximum value of the DC current Id output from the power control circuit 20 every polarity inversion time interval in the AC current conversion circuit 30 on the basis of the difference between the duty ratio of the discharge-lamp driving AC current I and a predetermined reference duty ratio. In this embodiment, it is assumed that the reference duty ratio is 50%.

Figure 5A:
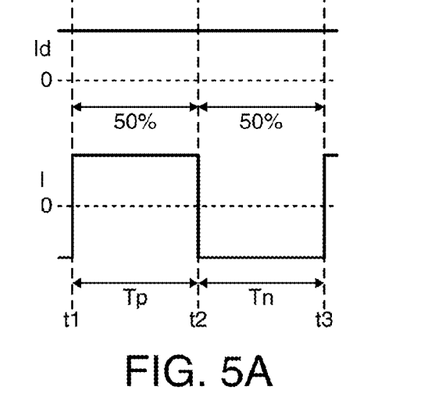
FIGS. 5A to 5E are diagrams illustrating a control method of the discharge lamp lighting device according to the embodiment of the invention.

FIG. 5A shows waveforms of the DC current Id output from the power control circuit 20 and the discharge-lamp driving AC current I at the reference duty ratio. The horizontal axis represents the time and the vertical axis represents the current value. Times t1, t2, and t3 represent the polarity inversion times of the discharge-lamp driving AC current I. The period of time when the discharge-lamp driving AC current I is in the first polarity (the first electrode 92 serves as the positive electrode) is defined as the first polarity interval Tp and the period of time when the discharge-lamp driving AC current I is in the second polarity (the second electrode 93 serves as the positive electrode) is defined as the second polarity interval Tn. The first polarity interval Tp and the second polarity interval Tn form one period. The polarity inversion time interval includes the first polarity interval Tp and the second polarity interval Tn. Here, the duty ratio of the discharge-lamp driving AC current I is a ratio of the first polarity interval Tp to one cycle of the AC current I.

In this embodiment, the control unit 40 performs the interval current control process so as to set to 0 the difference between the average value and the maximum value of the DC current Id output from the power control circuit 20 in the polarity inversion time interval when the duty ratio of the discharge-lamp driving AC current I is equal to the reference duty ratio. That is, in each of the first polarity interval Tp and the second polarity interval Tn, the interval current control process of setting the DC current Id output from the power control circuit 20 to be constant is performed.

Figure 5B:
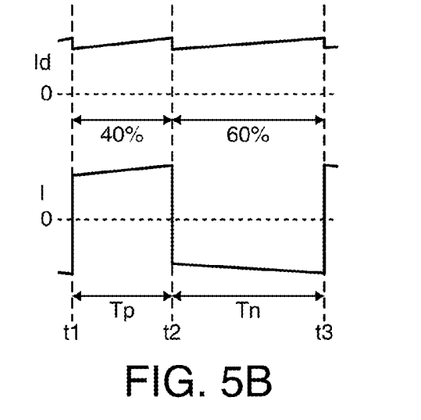

FIG. 5B shows waveforms of the DC current Id output from the power control circuit 20 and the discharge-lamp driving AC current I when the duty ratio of the discharge-lamp driving AC current I is 40%. In the polarity inversion time interval, that is, in each of the first polarity interval Tp and the second polarity interval Tn, the difference between the average value and the maximum value of the DC current Id output from the power control circuit 20 is provided.

In this embodiment, the control unit 40 performs the interval current control process so as to linearly monotonously increase the current value of the DC current Id output from the power control circuit 20 in the polarity inversion time interval. The waveform of the discharge-lamp driving AC current I is not limited to the above-mentioned waveform, but for example, another interval current control process of setting the current value of the DC current Id output from the power control circuit 20 in the polarity inversion time interval to the maximum may be performed in the second half of the polarity inversion time interval.

Figure 5C:
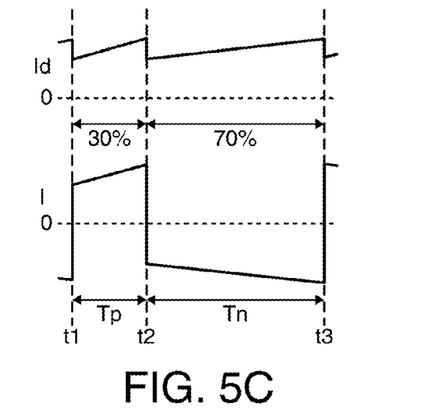

FIG. 5C shows waveforms of the DC current Id output from the power control circuit 20 and the discharge-lamp driving AC current I when the duty ratio of the discharge-lamp driving AC current I is 30%.

When the duty ratio of the discharge-lamp driving AC current I is 30%, the difference between the average value and the maximum value of the DC current Id output from the power control circuit 20 in the polarity inversion time interval, that is, in each of the first polarity interval Tp and the second polarity interval Tn, is greater than that of the case where the duty ratio of the discharge-lamp driving AC current I is 40% which is shown in FIG. 5B.

In this way, the control unit 40 may perform the interval current control process of increasing the difference between the average value and the maximum value of the DC current Id output from the power control circuit 20 every polarity inversion time interval as the difference between the duty ratio of the discharge-lamp driving AC current I and the reference duty ratio increases.

Although it has been described hitherto that the duty ratio of the discharge-lamp driving AC current I is smaller than the reference duty ratio, the same is true when the duty ratio of the discharge-lamp driving AC current I is greater than the reference duty ratio.

Figure 5D:
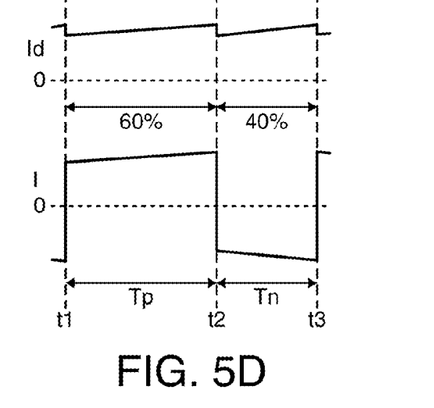
Figure 5E:
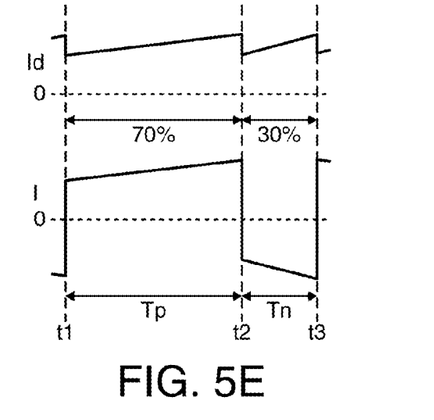

FIG. 5D shows waveforms of the DC current Id output from the power control circuit 20 and the discharge-lamp driving AC current I when the duty ratio of the discharge-lamp driving AC current I is 60%. FIG. 5E shows waveforms of the DC current Id output from the power control circuit 20 and the discharge-lamp driving AC current I when the duty ratio of the discharge-lamp driving AC current I is 70%.

In these cases, the control unit 40 performs the interval current control process so as to increase the difference between the average value and the maximum value of the DC current Id output from the power control circuit 20 every polarity inversion time interval as the difference between the duty ratio of the discharge-lamp driving AC current I and the reference duty ratio increases.

In the examples described with reference to FIGS. 5A to 5E, the control unit 40 performs the interval current control process of equalizing the average value of the DC current Id output from the power control circuit 20 every inversion time interval. Accordingly, it is possible to suppress the variation in brightness of the discharge lamp 90 due to the variation in current value of the discharge-lamp driving AC current I to the minimum.

(3) Example of Control by Combination of Interval Current Control Process and Duty Ratio Control Process A specific example of a control where the interval current control process and the duty ratio control process in the discharge lamp lighting device 10 according to this embodiment are combined will be described now.

In the discharge lamp lighting device 10 according to this embodiment, the control unit 40 performs the interval current control process of controlling the difference between the average value and the maximum value of the DC current Id output from the power control circuit 20 every polarity inversion time interval on the basis of the difference between the changed duty ratio and the reference duty ratio while performing the duty ratio control process of changing the duty ratio of the discharge-lamp driving AC current I in a periodic pattern.

Figure 6A:
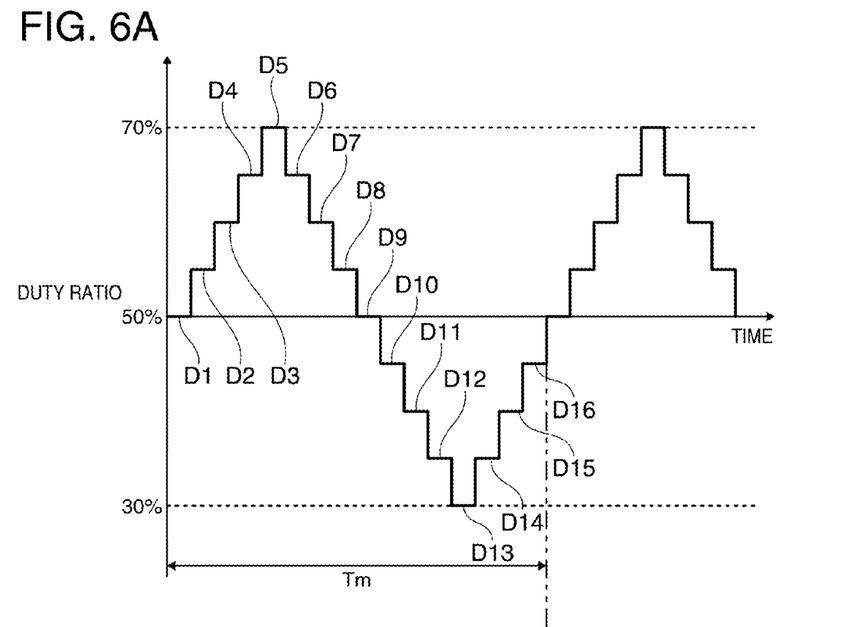
FIGS. 6A and 6B are diagrams illustrating the control method of the discharge lamp lighting device according to the embodiment of the invention.

FIG. 6A shows an example of the periodic pattern in which the duty ratio of the discharge-lamp driving AC current I shown in FIG. 6A is changed. In the drawing, the horizontal axis represents the time and the vertical axis represents the duty ratio.

In this embodiment, the control unit 40 allows the period of one period Tm of the periodic pattern to contain 16 segmented periods (segmented periods D1 to D16) in which the duty ratios of the discharge-lamp driving AC current I are kept equal to each other and performs the duty ratio control process of gradually changing the duty ratio. That is, the segment period is a period in which the same duty ratio control process is continuously performed. The length of one segmented period can be set to, for example, 1 second.

In the example shown in FIG. 6A, the duty ratio is set to 50% in the segmented period D1, the duty ratio is then increased by 5%, and the duty ratio is set to 70% as the maximum in the segmented period D5. Thereafter, the duty ratio is decreased by 5% and the duty ratio is set to 30% as the minimum in the segmented period D13. Thereafter, the duty ratio is increased by 5% and the increase and decrease of the duty ratio is repeated with a period Tm.

The periodic pattern in which the duty ratio of the discharge-lamp driving AC current I is changed is not limited to the above-mentioned example. The control unit 40 may perform the duty ratio control process so as to change the duty ratio in another periodic pattern which includes a plurality of segmented periods where the duty ratio of the discharge-lamp driving AC current I is kept at a constant value and in which the duty ratios of at least two segmented periods of the segmented periods are different from each other.

Figure 6B:
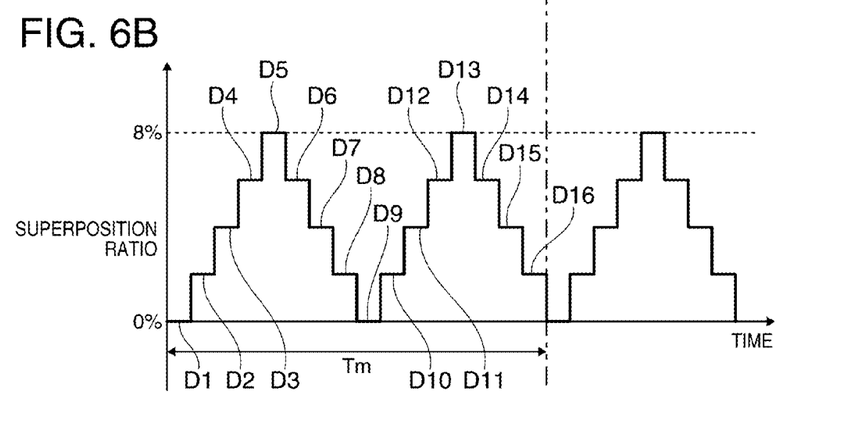

FIG. 6B shows an example of the variation in difference between the average value and the maximum value of the DC current Id output from the power control circuit 20 and corresponds to an example of the periodic pattern in which the duty ratio of the discharge-lamp driving AC current I shown in FIG. 6A is changed. In the drawing, the horizontal axis represents the time and the vertical axis represents the superposition ratio. Here, the superposition ratio is defined as follows.

Superposition Ratio=(Difference between average value and maximum value of DC current Id)/(Average value of DC current Id)

That is, when the interval current control process is performed so as to set the average values of the DC current Id to be equal to each other, the superposition ratio is proportional to the difference between the average value and the maximum value of the DC current Id.

In this embodiment, as described with reference to FIG. 6A, the segmented periods where the duty ratio of the discharge-lamp driving AC current I is kept at a constant value are provided and the duty ratio is gradually changed. Accordingly, the control unit 40 performs the interval current control process of gradually changing the superposition ratio on the basis of the gradual change of the duty ratio. That is, the segmented period is also a period when the interval current control process with the same superposition ratio is continuously performed.

In the example shown in FIG. 6B, the superposition ratio is set to 0% in the segmented period D1, the superposition ratio is then increased by 2%, and the superposition ratio is set to 8% as the maximum in the segmented period D5. Thereafter, the superposition ratio is decreased by 2% and the superposition ratio is set to 0% again in the segmented period D9. Thereafter, the superposition ratio is increased by 2% and the superposition ratio is set to 8% as the maximum in the segmented period D13. Thereafter, the superposition ratio is decreased by 2% and the increase and decrease of the superposition ratio is repeated with a period of Tm/2.

That is, in this embodiment, the control unit 40 performs the interval current control process of increasing the difference between the average value and the maximum value of the DC current Id output from the power control circuit 20 every polarity inversion time interval as the difference between the duty ratio of the discharge-lamp driving AC current I and the reference duty ratio increases.

Figure 7A:
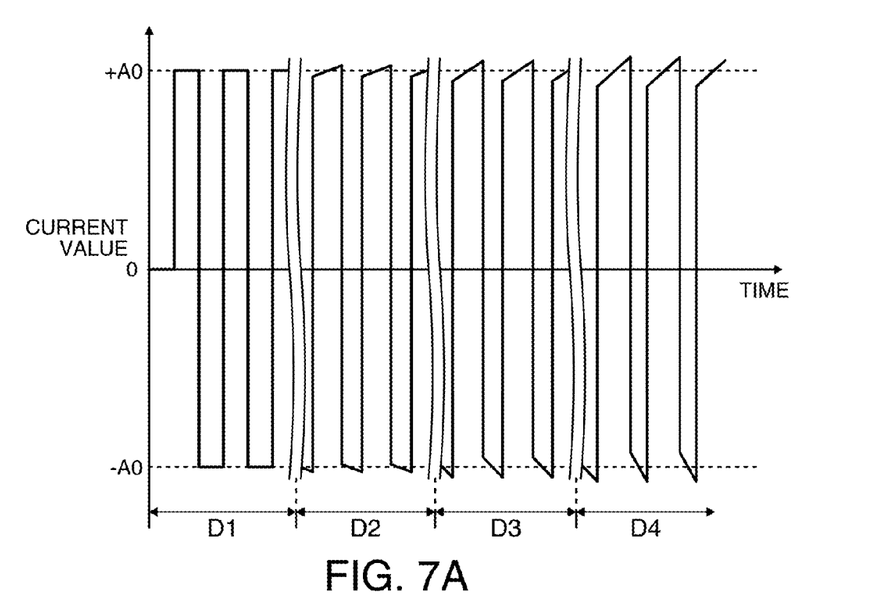
FIGS. 7A and 7B are diagrams illustrating the control method of the discharge lamp lighting device according to the embodiment of the invention.
Figure 7B:
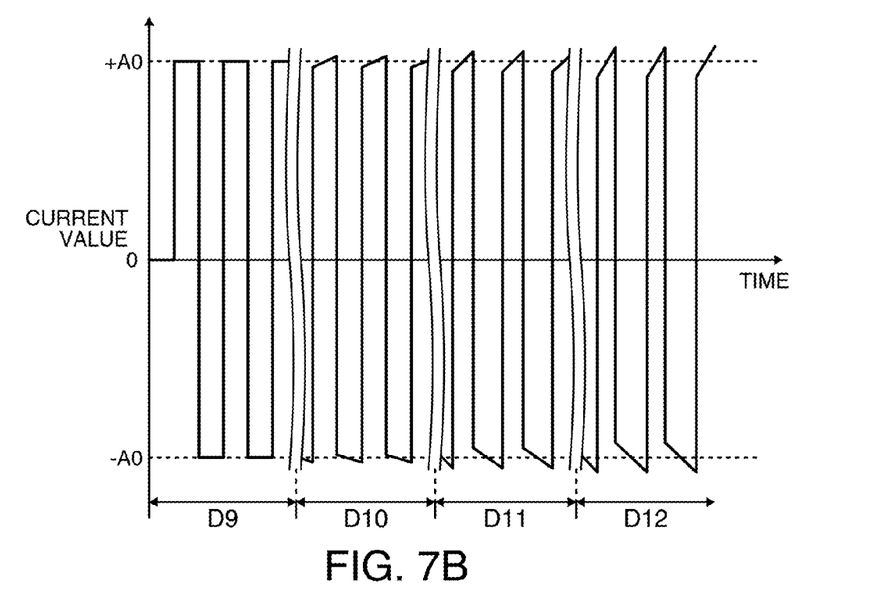

FIGS. 7A and 7B are graphs illustrating a change of waveform of the discharge-lamp driving AC current I in this embodiment. Here, the horizontal axis represents the time and the vertical axis represents the current value. In this embodiment, the interval current control process is performed so that the average current in the first polarity is +A0 and the average current in the second polarity is −A0.

FIG. 7A shows a change in waveform of the AC current I from the segmented period D1 to the segmented period D4 in FIG. 6A. In the segmented period D1, the current waveform with the duty ratio of 50% and the superposition ratio of 0% is maintained. In the segmented period D2, the current waveform is changed to a current waveform with the duty ratio of 55% and the superposition ratio of 2%, which is maintained in the segmented period D2. In the segmented period D3, the current waveform is changed to a current waveform with the duty ratio of 60% and the superposition ratio of 4%, which is maintained in the segmented period D3. In the segmented period D4, the current waveform is changed to the current waveform with the duty ratio of 65% and the superposition ratio of 6%, which is maintained in the segmented period D4. Thereafter, similarly in the segmented periods D5 to D8, the AC current I has the waveforms with the duty ratios and the superposition ratios shown in FIGS. 6A and 6B.

FIG. 7B shows a change in waveform of the AC current I from the segmented period D9 to the segmented period D12 in FIG. 6A. In the segmented period D9, the current waveform with the duty ratio of 50% and the superposition ratio of 0% is maintained. In the segmented period D10, the current waveform is changed to a current waveform with the duty ratio of 45% and the superposition ratio of 2%, which is maintained in the segmented period D10. In the segmented period D11, the current waveform is changed to a current waveform with the duty ratio of 40% and the superposition ratio of 4%, which is maintained in the segmented period D11. In the segmented period D12, the current waveform is changed to the current waveform with the duty ratio of 35% and the superposition ratio of 6%, which is maintained in the segmented period D12. Thereafter, similarly in the segmented periods D13 to D16, the AC current I has the waveforms with the duty ratios and the superposition ratios shown in FIGS. 6A and 6B.

In this way, by performing the duty ratio control process so as to change the duty ratio in the periodic pattern which includes plural segmented periods where the duty ratio of the discharge-lamp driving AC current I is kept at a constant value and in which the duty ratios of at least two segmented periods of the plurality of segmented periods are different from each other, it is possible to greatly change the thermal status of both electrodes of the discharge lamp 90 and around both electrodes with a relatively long time scale. Accordingly, it is possible to prevent the normal stable convection from being formed in a light-emitting tube of the discharge lamp. As a result, since it is possible to prevent both electrodes from being partially dissipated or to prevent the electrode material from being partially segregated, it is possible to elongate the lifetime of the discharge lamp 90.

(4) Verification of Effect when Discharge Lamp Lighting Device According to This Embodiment is Applied to Projector An example for verifying the effect when the discharge lamp lighting device 10 according to this embodiment is applied to a projector 100 employing a discharge lamp 90 and a liquid crystal panel 95 as a light modulator will be described now.

Figure 8:
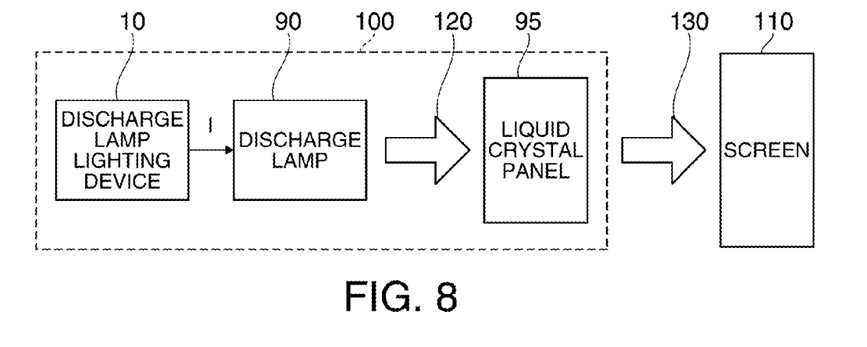
FIG. 8 is a diagram illustrating an effect of the discharge lamp lighting device according to the embodiment of the invention.

FIG. 8 is a diagram illustrating a configuration of the projector 100 employing the discharge lamp lighting device 10 according to this embodiment.

The projector 100 includes the discharge lamp lighting device 10 and the discharge lamp 90. The discharge lamp lighting device 10 supplies AC current I for driving the discharge lamp 90 to the discharge lamp 90. This configuration is the same as described with reference to FIG. 1.

The projector 100 includes a liquid crystal panel 95. The liquid crystal panel 95 serves as a light modulator modulating a projection beam 120 from the discharge lamp 90. The polarization state of the liquid crystal panel 95 is adjusted in the unit of pixels on the basis of a control signal from a control unit not shown. By projecting the transmitted beam 130 passing through the liquid crystal panel 95 onto a screen 110, the projector 100 can project a desired image.

Figure 9A:
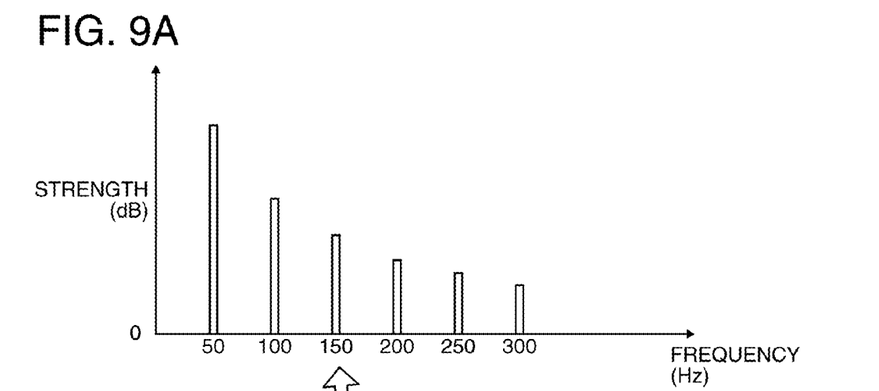
FIGS. 9A and 9B are diagrams illustrating the effect of the discharge lamp lighting device according to the embodiment of the invention.

FIG. 9A is a graph schematically illustrating a variation in brightness by the liquid crystal panel 95, which is subjected to the Fourier transformation. Here, the horizontal axis represents the frequency and the vertical axis represents the strength.

In the projector 100 employing the liquid crystal panel 95, since display data of the liquid crystal panel 95 is rewritten periodically, the brightness is also periodically changed. For example, when the rewriting frequency is 50 Hz, the brightness is periodically changed at frequencies of 50 Hz and the integral multiple of the rewriting frequency.

Figure 9B:
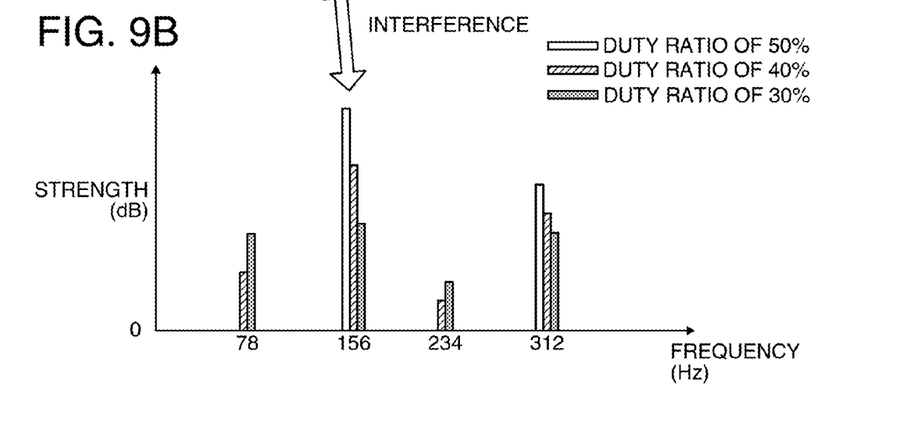

FIG. 9B is a graph schematically illustrating a variation in brightness by the discharge lamp 90, which is subjected to the Fourier transformation. Here, the horizontal axis represents the frequency and the vertical axis represents the strength.

When the DC current Id of each polarity inversion time interval is changed (for example, is monotonously increased in the polarity inversion time interval) to generate the discharge-lamp driving AC current I, the brightness of the discharge lamp 90 is also periodically changed. For example, when the duty ratio is set to 50% and the frequency of the discharge-lamp driving AC current is set to 78 Hz, the brightness of the discharge lamp is periodically changed at frequencies of 156 Hz which is double the frequency and the integral multiple of the frequency.

When the discharge lamp 90 and the liquid crystal panel 95 are combined, the periodical changes in brightness interfere with each other, thereby causing a scroll noise. For example, in the above-mentioned example, the change in brightness of the discharge lamp 90 of 156 Hz and the change in brightness of the liquid crystal panel 95 of 150 Hz interfere with each other, thereby causing a scroll noise of 6 Hz.

On the other hand, when the duty ratio of the discharge-lamp driving AC current I is brought apart from the 50% and is changed to, for example, 40% and 30%, it is known in the change in brightness of the discharge lamp 90 that the frequency component of odd number times 78 Hz is strengthened and the frequency component of even number times 78 Hz is weakened. Accordingly, as the difference between the duty ratio of the discharge-lamp driving AC current I and the duty ratio of 50% increases, the scroll noise due to the interference of the change in brightness of the liquid crystal panel 95 of 156 Hz with the change in brightness of the discharge lamp 90 of 150 Hz gets less visible.

When the difference between the average value and the maximum value of the DC current Id in each polarity inversion time interval decreases, the change in brightness of the discharge lamp 90 decreases. Accordingly, the scroll noise due to the interference with the change in brightness of the liquid crystal panel 95 gets less visible.

The discharge lamp lighting device 10 according to this embodiment performs the interval current control process of increasing the difference between the average value and the maximum value of the DC current Id in each polarity inversion time interval as the difference between the duty ratio of the discharge-lamp driving AC current I and the reference duty ratio of 50% increases.

That is, when the frequency component of 156 Hz increases due to the change in brightness of the discharge lamp 90 (when the duty ratio is close to 50%), it is possible to suppress the scroll noise by decreasing the difference between the average value and the maximum value of the DC current Id in each polarity inversion time interval.

When the frequency component of 156 Hz decreases due to the change in brightness of the discharge lamp 90 (when the duty ratio is apart from 50%), the scroll noise gets less visible. Accordingly, it is possible to obtain the known effect of suppressing a flicker by increasing the difference between the average value and the maximum value of the DC current Id in each polarity inversion time interval.

As described above, in the discharge lamp lighting device 10 according to this embodiment, it is possible to more easily suppress the scroll noise so as not to be visible than usual while suppressing the flicker of the discharge lamp 90. Accordingly, regarding the rewriting frequency (operating frequency) of the liquid crystal panel 95, it is possible to more freely select the frequency of the discharge-lamp driving AC current than usual. It is also possible to elongate the lifetime of the discharge lamp 90 by changing the duty ratio of the discharge-lamp driving AC current in a periodic pattern.

3. Circuit Configuration of Projector

Figure 10:
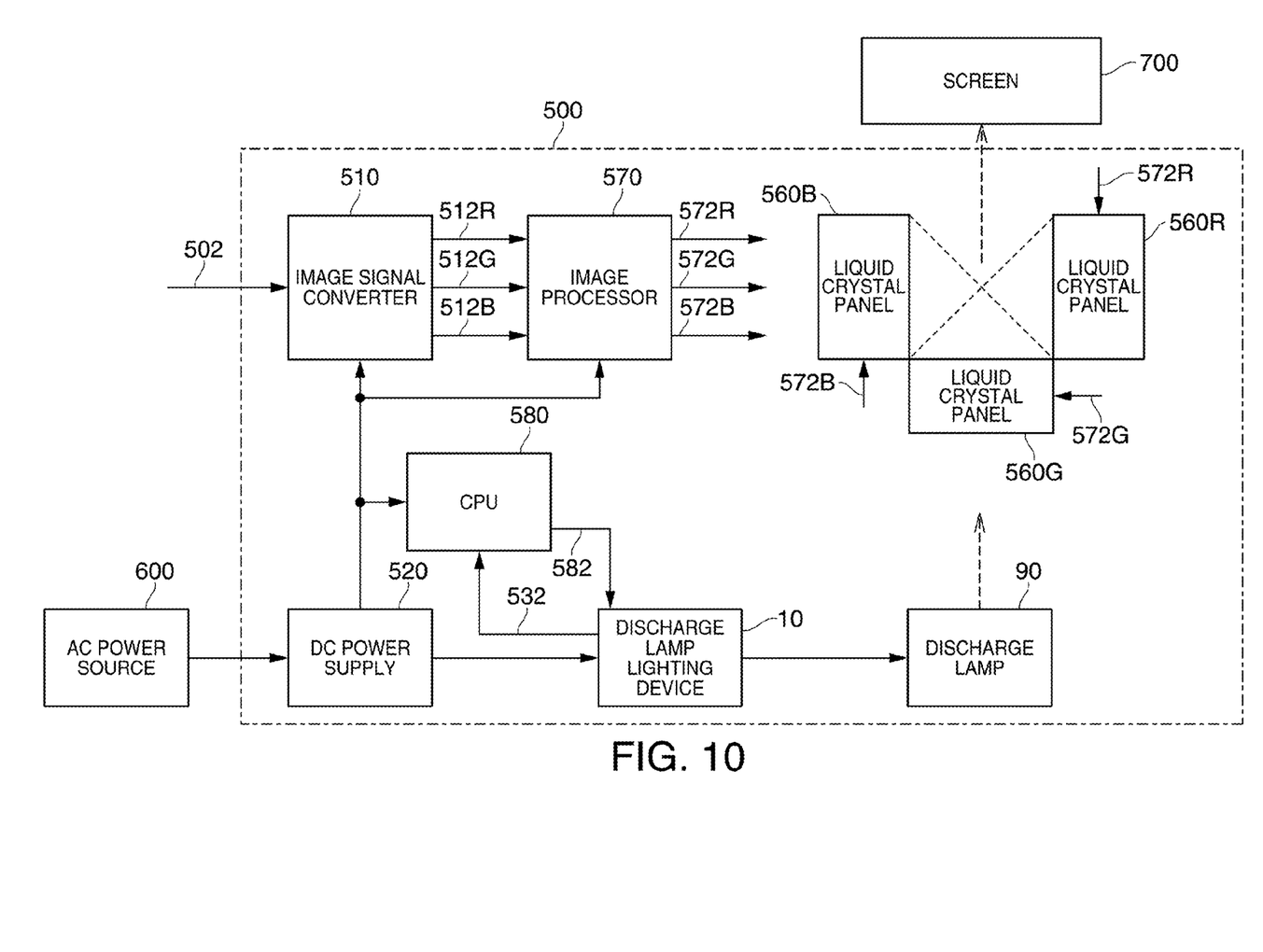
FIG. 10 is a diagram illustrating a configuration of a projector according to an embodiment of the invention.

FIG. 10 is a diagram illustrating a configuration of a projector according to this embodiment. The projector 500 includes an image signal converter 510, a DC power supply 520, a discharge lamp lighting device 10, a discharge lamp 90, liquid crystal panels 560R, 560G, and 560B, and an image processor 570, in addition to the above-mentioned optical system.

The image signal converter 510 converts an image signal 502 (such as a brightness-chrominance signal or an analog RGB signal) input from the outside into a digital RGB signal having a predetermined word length to generate image signals 512R, 512G, and 512B and supplies the generated image signals to the image processor 570.

The image processor 570 processes three image signals 512R, 512G, and 512B and outputs driving signals 572R, 572G, and 572B for driving the liquid crystal panels 560R, 560G, and 560B, respectively.

The DC power supply 520 converts an AC voltage supplied from an external AC power supply 600 into a constant DC voltage and supplies the DC voltage to the image signal converter 510 and the image processor 570 disposed on the secondary side of a transformer (included in the DC power supply 520 although not shown), and the discharge lamp lighting device 10 disposed on the primary side of the transformer.

The discharge lamp lighting device 10 generates a high voltage between the electrodes of the discharge lamp 90 at the time of starting up and breaks down the electric insulation to form a discharge path and supplies driving current for allowing the discharge lamp 90 to maintain a discharge.

Images based on the driving signals 572R, 572G, and 572B are displayed on the liquid crystal panels 560R, 560G, and 560B and the brightness of color beams incident on the liquid crystal panels is modulated by the images.

A CPU 580 controls operations from the start of lighting of the projector to the extinction. When the projector is turned on and the output voltage of the DC power supply 520 reaches a predetermined value, a lighting signal 582 is generated and is supplied to the discharge lamp lighting device 10. The CPU 580 may receive lighting information 532 of the discharge lamp 90 from the discharge lamp lighting device 10.

In the projector 500 having the above-mentioned configuration, it is possible to more easily suppress the scroll noise so as not to be visible than usual while suppressing the flicker of the discharge lamp 90. Accordingly, regarding the rewriting frequencies (operating frequencies) of the liquid crystal panels 560R, 560G, and 560B, it is possible to more freely select the frequency of the discharge-lamp driving AC current than usual. It is also possible to embody a projector of which the lifetime of the discharge lamp 90 can be elongated by changing the duty ratio of the discharge-lamp driving AC current in a periodic pattern.

The invention is not limited to the above-mentioned embodiments, but may be modified in various forms without departing from the gist of the invention.

Although the projector employing three liquid crystal panels has been described in the above-mentioned embodiments, the invention is not limited to the embodiments, but may be applied to projectors employing one, two, or four or more liquid crystal panels.

Although a transmissive projector has been described in the above-mentioned embodiments, the invention is not limited to the embodiments, but may be applied to a reflective projector. Here, the "transmissive" means a type in which an electro-optical modulator as a light modulator such as a transmissive liquid crystal panel transmits light and the "reflective" means a type in which an electro-optical modulator as a light modulator such as a reflective liquid crystal panel or a micro-mirror light modulator reflects light. For example, a DMD (Digital Micro mirror Device) (trademark of Texas Instrument) can be used as the micro-mirror light modulator. When the invention is applied to the reflective projector, it is also possible to obtain the same advantages as the transmissive projector.

The invention may be applied to a front projection type projector projecting a projection image from an observer side and a rear projection type projector projecting a projection image from an opposite side of the observer side.

The invention includes a configuration (for example, a configuration having the same function, method, and result or a configuration having the same objects and advantages) substantially equivalent to the configurations described in the above-mentioned embodiments. The invention also includes a configuration obtained by replacing non-essential components of the configuration described in the above-mentioned embodiments. The invention also includes a configuration providing the same operational advantages as described in the above-mentioned embodiments or a configuration accomplishing the same objects. The invention also includes a configuration obtained by adding known techniques to the configurations described in the above-mentioned embodiments.

Although it has been described in the embodiment, for example, that the duty ratio of the discharge-lamp driving AC current I is changed in a periodic pattern, the invention may be embodied as a discharge lamp lighting device having plural operation modes in which the duty ratios of the discharge-lamp driving AC current I are difference from each other and properly switching the operation modes and a projector employing the discharge lamp lighting device.

The entire disclosure of Japanese Patent Application No. 2008-066098, filed Mar. 14, 2008 is expressly incorporated by reference herein.

What is claimed is:

1. A discharge lamp lighting device comprising:
   a power control circuit outputting DC current;
   an AC conversion circuit being supplied with the DC current and generating and outputting discharge-lamp driving AC current by inverting the polarity of the DC current at a predetermined time; and
   a control unit performing a duty ratio control process of controlling a polarity inversion time of the discharge-lamp driving AC current on the AC conversion circuit to control a duty ratio of the discharge-lamp driving AC current and performing an interval current control process of controlling a current value of the DC current every polarity inversion time interval on the power control circuit,
   the control unit performing the interval current control process so as to control a difference between an average value and a maximum value of the DC current of each polarity inversion time interval on the basis of a difference between the duty ratio of the discharge-lamp driving AC current and a predetermined reference duty ratio of the discharge-lamp driving AC current.

2. The discharge lamp lighting device according to claim 1, wherein the control unit performs the interval current control process so as to increase the difference between the average value and the maximum value of the DC current of each polarity inversion time interval as the difference between the duty ratio and the reference duty ratio increases.

3. A projector comprising the discharge lamp lighting device according to claim 2.

4. The discharge lamp lighting device according to claim 1, wherein the control unit performs the interval current control process so as to set to the maximum the current value of the DC current in each polarity inversion time interval in the second half of the polarity inversion time interval.

5. A projector comprising the discharge lamp lighting device according to claim 4.

6. The discharge lamp lighting device according to claim 1, wherein the control unit performs the interval current control process so as to monotonously increase the current value of the DC current in the polarity inversion time interval.

7. A projector comprising the discharge lamp lighting device according to claim 6.

8. The discharge lamp lighting device according to claim 1, wherein the control unit performs the interval current control process so as to set to the difference between the average value and the maximum value of the DC current every polarity inversion time interval when the duty ratio is equal to the reference duty ratio.

9. A projector comprising the discharge lamp lighting device according to claim 8.

10. The discharge lamp lighting device according to claim 1, wherein the control unit performs the interval current control process so as to set the average values of the DC current of the respective polarity inversion time intervals to be equal to each other.

11. A projector comprising the discharge lamp lighting device according to claim 10.

12. The discharge lamp lighting device according to claim 1, wherein the control unit performs the duty ratio control process so as to change the duty ratio in a periodic pattern.

13. The discharge lamp lighting device according to claim 12, wherein the control unit performs the duty ratio control process so as to change the duty ratio in the periodic pattern which includes a plurality of segmented periods where the duty ratio is kept at a constant value and in which the duty ratios of at least two segmented periods of the plurality of segmented periods are different from each other.

14. A projector comprising the discharge lamp lighting device according to claim 13.

15. A projector comprising the discharge lamp lighting device according to claim 12.

16. A projector comprising the discharge lamp lighting device according to claim 1.

17. A control method of a discharge lamp lighting device having a power control circuit outputting DC current and an AC conversion circuit being supplied with the DC current and generating and outputting discharge-lamp driving AC current by inverting the polarity of the DC current at a predetermined time, the control method comprising:

controlling a polarity inversion time of the discharge-lamp driving AC current on the AC conversion circuit to control a duty ratio of the discharge-lamp driving AC current; and controlling a difference between an average value and a maximum value of the DC current of each polarity inversion time interval on the basis of a difference between the duty ratio of the discharge-lamp driving AC current and a predetermined reference duty ratio of the discharge-lamp driving AC current.

* * * * *